United States Patent
Gemeinhardt et al.

(10) Patent No.: US 6,899,016 B2
(45) Date of Patent: May 31, 2005

(54) MASTER CYLINDER

(75) Inventors: André Gemeinhardt, Obereuerheim (DE); Ralf Koberstein, Völkersleier (DE); Klaus Reuter, Oberthulba (DE); Klaus Krappmann, Gochsheim (DE)

(73) Assignee: ZF Sachs AG, Schweinfurt (DE)

( * ) Notice: Subject to any disclaimer, the term of this patent is extended or adjusted under 35 U.S.C. 154(b) by 3 days.

(21) Appl. No.: 10/633,424

(22) Filed: Aug. 1, 2003

(65) Prior Publication Data

US 2004/0055461 A1 Mar. 25, 2004

(30) Foreign Application Priority Data

Aug. 1, 2002 (EP) .............................................. 02017259

(51) Int. Cl.$^7$ .............................................. F01B 29/00
(52) U.S. Cl. .......................................... 92/128; 92/187
(58) Field of Search ........................ 92/128, 187, 188; 403/133

(56) References Cited

U.S. PATENT DOCUMENTS

| | | | | |
|---|---|---|---|---|
| 1,456,727 A | * | 5/1923 | Framchi ...................... | 92/187 |
| 4,650,363 A | * | 3/1987 | Kehl et al. .................. | 403/140 |
| 5,163,773 A | | 11/1992 | Denney et al. | |
| 5,290,120 A | * | 3/1994 | Osterfeld et al. ............. | 92/187 |
| 5,335,585 A | | 8/1994 | Fischenich et al. | |
| 5,499,570 A | * | 3/1996 | Bergelin et al. .............. | 92/128 |
| 5,794,512 A | | 8/1998 | Prosch et al. | |
| 6,336,329 B1 | * | 1/2002 | Adler et al. .................. | 92/128 |
| 6,470,791 B1 | * | 10/2002 | Welter et al. ................. | 92/188 |

FOREIGN PATENT DOCUMENTS

GB                 407 148              3/1934

* cited by examiner

*Primary Examiner*—Thomas E. Lazo
(74) *Attorney, Agent, or Firm*—Cohen Pontani, Lieberman & Pavane

(57) ABSTRACT

A master cylinder for a hydraulically actuated clutch or brake system in a motor vehicle includes a piston in a housing, the piston being axially movable in the housing by a piston rod. The piston rod has a ball-shaped head, at least certain areas of which are surrounded by first and second shell-like support elements which form a ball socket, so that the piston and the piston rod are connected to each other essentially without play, but are still free to swivel with respect to each other. The support elements are arranged at least in part inside a piston shaft sleeve, against which these elements may be supported when forces introduced via the piston rod act upon them. The first support element has a hemispherical shell to enclose half of the ball-shaped head. The other side of the ball-shaped head, except for a certain clearance required for swiveling, is surrounded by a support element with a spherical-segment-shaped ring, through the opening in which the piston rod passes.

18 Claims, 4 Drawing Sheets

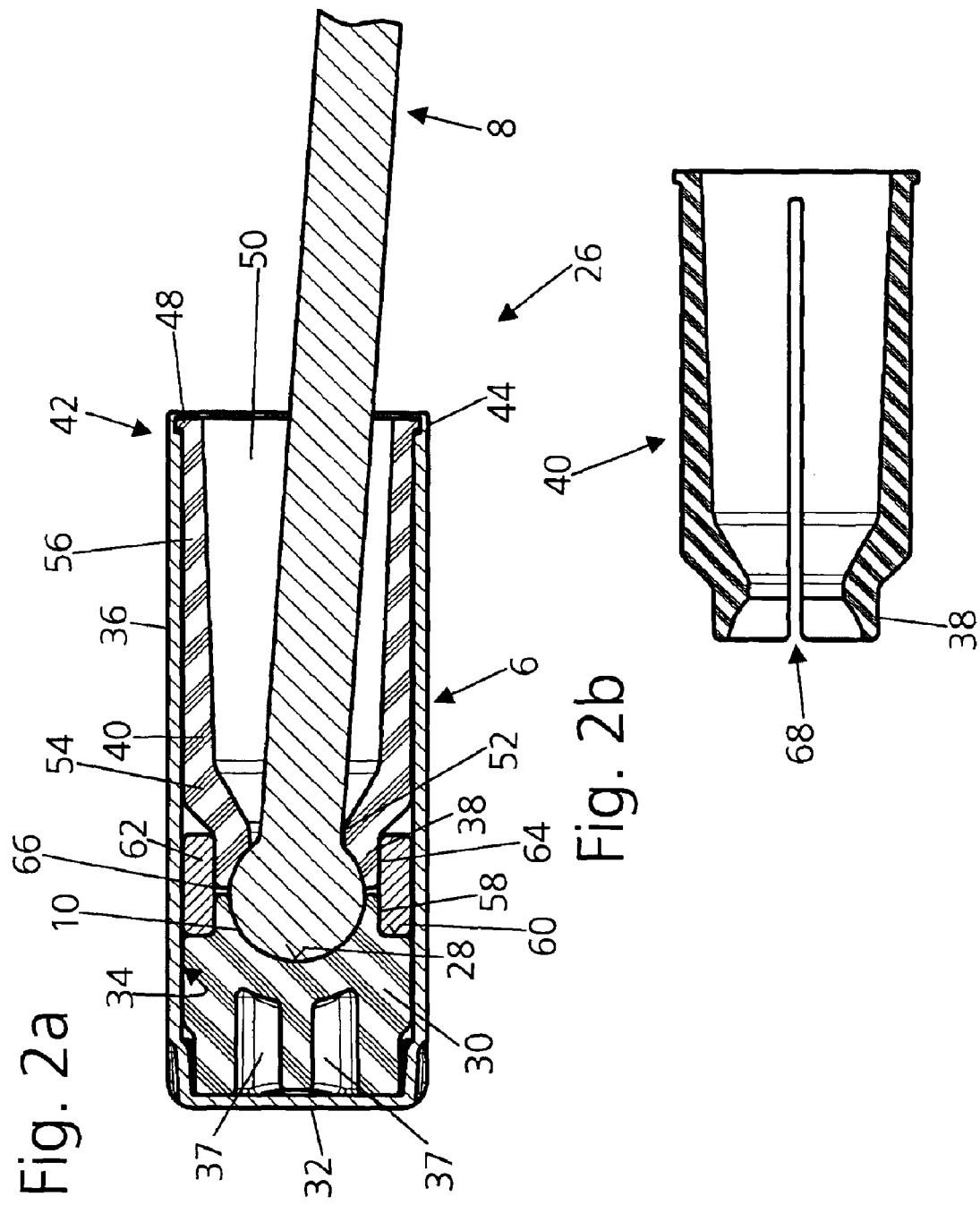

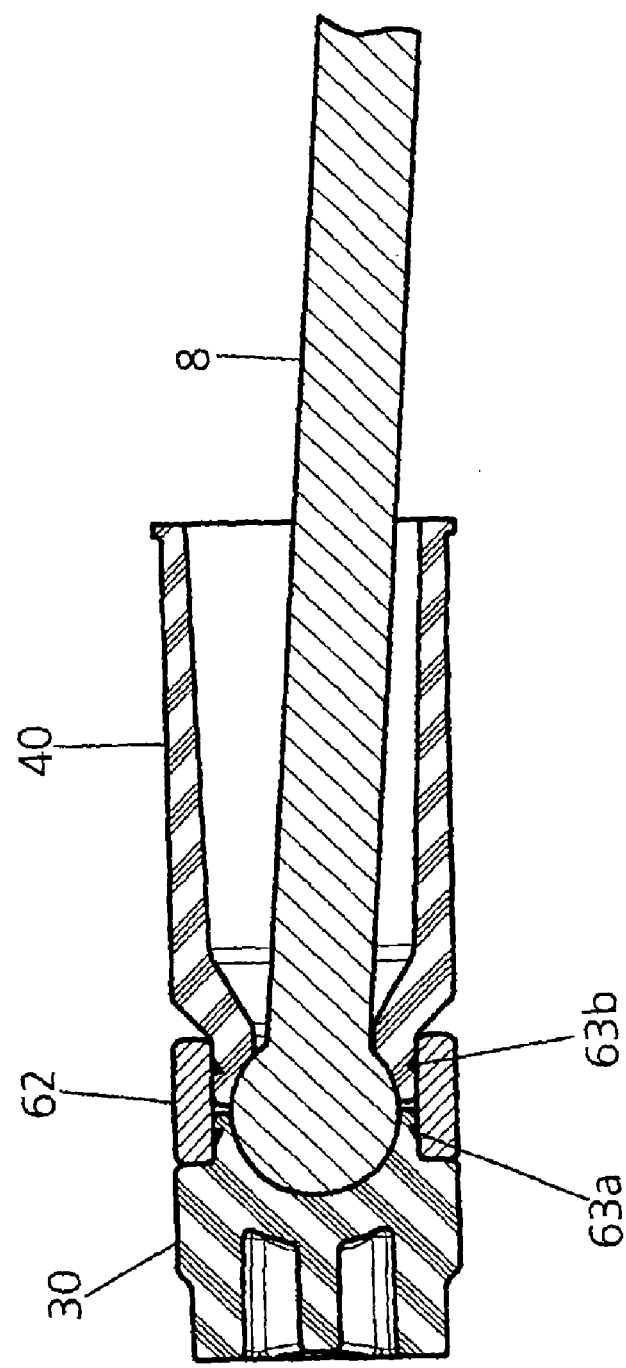

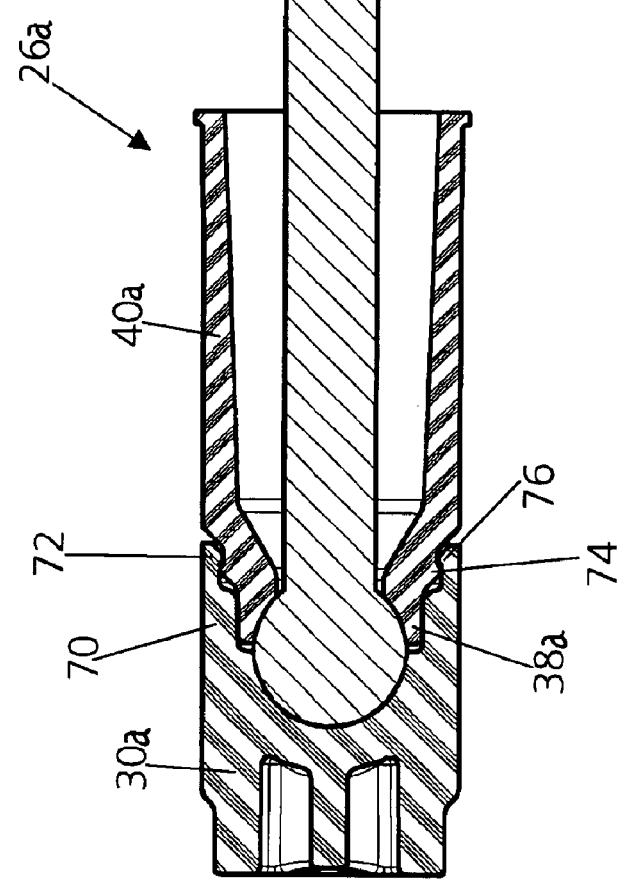
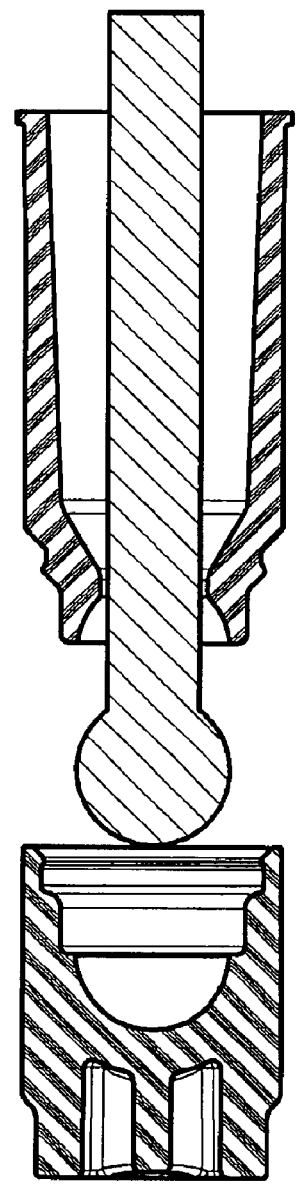
Fig. 3a
Fig. 3b

MASTER CYLINDER

BACKGROUND OF THE INVENTION

1. Field of the Invention

The invention relates to a master cylinder for a hydraulically actuated clutch or a brake system in a motor vehicle.

2. Description of the Related Art

A master cylinder for hydraulically actuating a clutch or brake system is known from, for example, U.S. Pat. No. 5,335,585. In this reference, the master cylinder is activated by the brake or clutch pedal, which is connected to the piston rod of the cylinder. The hydraulic pressure generated in the master cylinder is transmitted through a hydraulic fluid-filled system of lines to a slave cylinder, where it has the effect of displacing the working piston and thus of actuating, for example, a clutch-release mechanism or a brake.

The master cylinder disclosed in U.S. Pat. No. 5,335,585 has a piston unit with a piston rod. A ball-shaped head at the end of the piston rod facing the pressure space is surrounded by a spherical shell part arranged at an end of the ball-shaped head and by two spherical half shell segments, which are arranged radially with respect to each other and which grip opposing semicircular areas of the ball-shaped head. The spherical half shell segments have radially inward-pointing projections at ends facing the pressure space, which engage in a groove in a neck formed on the piston. Except for the head of the piston facing the pressure space, the outside wall of the piston is formed by a piston shaft sleeve, which radially surrounds the individual parts and holds them together. In this way, the piston and the piston rod are connected to each other positively and essentially without play but still with the ability to swivel with respect to each other.

The piston design described above is very expensive because of the large number of parts. More specifically, three support elements are required to support the ball-shaped head of the piston rod. Each of these elements must be produced with high precision and mounted precisely in the piston. Another disadvantage of this design is that it is not very stiff. A tensile force introduced via the piston rod causes the spherical half shell segments to spread radially apart. Because these segments rest directly on the relatively thin-walled piston shaft sleeve, the sleeve itself can also expand radially, so that ultimately the sliding properties of the piston in the cylinder can be negatively affected. As a result of this expansion of the spherical half shell elements, the support of the ball-shaped head gradually and irreversibly loosens over the course of time, as a result of which undesirable gaps which allow play can develop. It is also known that, for example, 1 millimeter of play in a master cylinder can cause a dead travel of approximately 5–6 millimeters at the clutch pedal, the exact distance depending on the lever ratio.

Another master cylinder with a piston and an attached piston rod which can swivel with respect to the piston is described in U.S. Pat. No. 5,794,512, in which a piston shaft sleeve designed with a bottom accepts two retaining shells for the ball-shaped head of the piston rod. The retaining shells are arranged radially with respect to each other. On a side facing away from the bottom of the piston, the retaining shells have semicircular recesses, which positively retain the ball-shaped head. The retaining shells are also provided with slots in their end surfaces. The slots forms several segments which grip the ball while also allowing it to swivel. The segments have at their ends, radially inward-pointing snap-in projections which are surrounded by a free space. When the ball-shaped head is snapped into its bearing seat, the segments are thus able to move radially outward into the free space. To prevent the ball-shaped head from shifting in an unwanted manner, the snap-in projections are provided on the side facing the ball with a sharp-edged transition, on which an undercut is provided.

A disadvantage of this design is that under alternating compressive/tensile forces on the piston rod, a certain amount of dead travel caused by intermediate play may occur. Especially in the case of tensile forces, the area of the ball-shaped head adjacent to the piston rod may serve as a ramp for the segments, which can then escape radially to the outside despite their sharp-edged snap-in projections.

SUMMARY OF THE INVENTION

An object of the present invention is to provide a master cylinder for actuating a hydraulic clutch or brake in a motor vehicle that overcomes the disadvantages of the prior art. More specifically, the object of the present invention is to provide a master cylinder so that a ball-shaped head connected to a piston rod is supported without play and also so that, when the cylinder is actuated, the compressive and tensile forces acting on the piston can be transmitted to the hydraulic system without losses.

The object of the present invention is acheived by a master cylinder for a hydraulically actuated clutch or brake system which includes a housing, a piston axially movably arranged in the housing and a piston rod having a ball-shaped head connected to the piston. The piston includes a piston shaft sleeve and first and second support elements forming a spherical socket supporting the ball-shaped head. The first and second support elements are supported by the piston shaft sleeve against forces introduced by the piston rod so that the piston and the piston rod are connected to each other essentially without play and are swivelable relative to each other. The first support includes a hemispherical shell enclosing the half of the ball-shaped head which faces away from the piston rod. The second support element includes a spherical segment-shaped ring defining an opening through which the piston rod passes. The second support element supports the second half of the ball-shaped head.

Because the first and the second support elements are arranged axially with respect to each other and form a closed ring, the support elements have no freedom to expand radially when axial forces from the piston rod act on the ball-shaped head. Accordingly, the present invention prevents the formation of axial play between the ball-shaped head and its bearing seat.

The first support element may be supported axially against the bottom of the piston so that no additional anchoring or support points are required.

The spherical segment-shaped ring is advantageously formed on a support sleeve through which the piston rod passes.

The support sleeve may be secured axially at one end of the piston shaft sleeve by a latching connection or by a collar formed on the piston shaft sleeve. A contact surface for the piston rod may be provided directly on the support sleeve.

The support sleeve may have at least one axial slot in the area of the spherical segment-shaped ring. Furthermore, the area having the axial slot may be surrounded by a take-up ring. The axial slots allow the installation of piston rods which have a ball-shaped head or a fastening element at both ends with a dimension larger than the inside diameter of the spherical segment-shaped ring. The take-up ring surrounds the spherical segment-shaped ring in the assembled state, so that the radial forces which occur on the spherical segment-shaped ring are completely taken up by the take-up ring and are prevented from being transmitted to the piston shaft sleeve.

The areas of the support element and the support sleeve which oppose each other may be surrounded by a common take-up ring to achieve a high degree of dimensional accuracy for the ball socket.

According to the present invention, a latching connection may be provided between the take-up ring and the support element and/or between the take-up ring the support sleeve. If such latching connections are provided, the support elements and the piston rod may be preassembled to form a unit before they are inserted into the piston shaft sleeve, so that the reliable functioning of the ball joint can be ensured right from the beginning.

If the support element has a ring-shaped web in the area proximate the hemispherical shell to engage a recess in the spherical segment-shaped ring, a separate take-up ring may be omitted even when a slotted support sleeve is used.

The support element and the support sleeve form a support frame for the piston shaft sleeve. As a result, the wall of the piston shaft sleeve may be made even thinner than in the past. More specifically, the thickness of the wall of the piston shaft sleeve may be reduced to less than one millimeter, e.g., to 0.5–0.7 millimeter.

The piston shaft sleeve may be formed as a thin-walled, deep-drawn part made of metal.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference characters denote similar elements throughout the several views:

FIG. 2a is an axial cross-sectional view taken through a piston unit according to the master cylinder of FIG. 1;

FIG. 2b is a cross-sectional view of a slotted support sleeve of the piston unit of FIG. 2a;

FIG. 2c is a cross-sectional view of a piston unit which has been preassembled using latching connections;

FIG. 3a is a cross-sectional view of another exemplary embodiment of a piston unit according to the present invention; and FIG. 3b is a cross-sectional exploded view of the components of the piston unit of FIG. 3a.

DETAILED DESCRIPTION OF THE PREFERRED EMBODIMENTS

Figure 1:
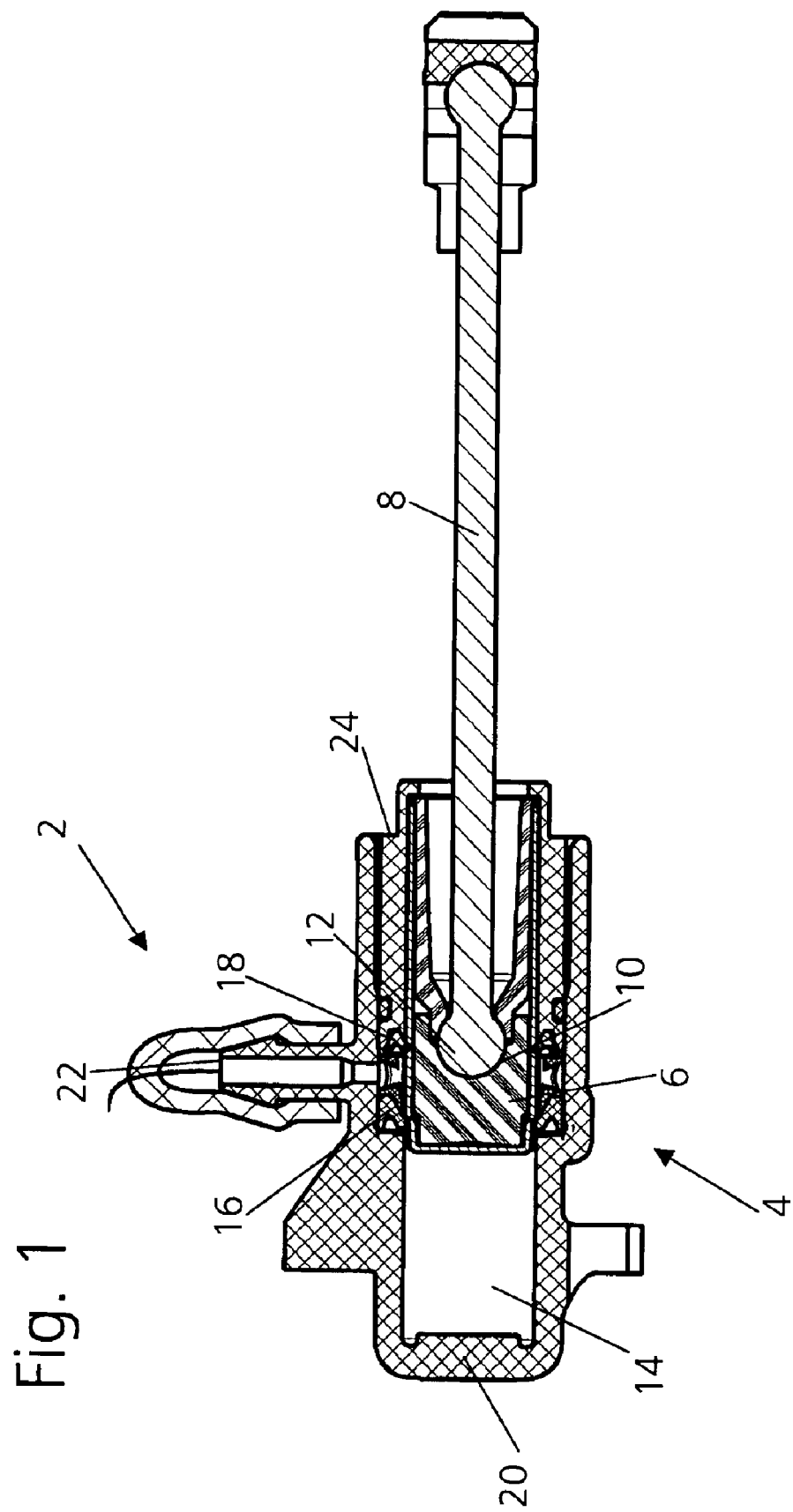
FIG. 1 is a cross-sectional view of a master cylinder of a hydraulic clutch system according to the present invention.

FIG. 1 shows an assembled master cylinder 2 of a hydraulic clutch actuation system of a motor vehicle including a cylindrical housing 4 and a piston 6 which slides axially therein. The piston 6 is controlled by a piston rod 8 in working connection with a pedal. The connection between the piston rod 8 and the piston 6 is usually realized in the form of a ball joint 10, wherein a socket portion of the ball joint 10 at least partially surrounds a ball-shaped head 12 connected to the piston rod 8, the ball joint 10 allowing piston 6 and the piston rod 8 to swivel with respect to each other. The end surface of the piston 6 and the inside walls of the housing 4 define a pressure space 14, which is sealed off against the movable piston 6 by two ring-shaped lip seals 16, 18, separated by a certain axial distance. The housing 4 includes a forward housing part 20 and a rear housing part 24. The forward housing part 20 has a lateral opening 22, which is connected to a hydraulic fluid reservoir (not shown), and also an opening which provides a flow connection to a slave cylinder (also not shown in the drawing). The forward housing part 20 also includes a forward section proximate a closed side of the forward housing part and a rear section proximate an open side of the forward housing part. The rear section proximate the open side of forward housing part 20 is a cylindrical widened section and extends over approximately half the length of the housing 4. This widened section holds the sealing arrangement 16, 18 and also the rear housing part 24, which is designed as a guide sleeve. The inside diameter of the forward section of the forward housing part 20 and that of the rear housing part 24 are identical, so that the piston 6 is guided by both housing parts 20, 24, which are secured to each other by a known snap-together connection (not shown).

In the following, the design of a piston unit 26 formed by the piston 6 and the piston rod 8 is described in detail with reference to FIGS. 2a–c and 3a–b. According to the present invention, the half of the ball-shaped head 12 facing away from the piston rod 8 in FIG. 2a is surrounded almost completely by a first support element 30 which is essentially cylindrical and injection-molded of plastic. The first support element 30 includes a recess defining a hemispherical shell 28 and is supported axially against a bottom 32 and radially against the inside lateral surface 34 of the piston shaft sleeve 36. Furthermore, first support element 30 extends from the bottom 32 of the piston shaft sleeve 36 to approximately the middle of the ball-shaped head 12. In the area of the bottom 32, the support element 30 has several recesses 37 to avoid a concentration of mass.

A spherical segment-shaped ring 38, also made of injection-molded plastic, is provided on the side of the ball-shaped head 12 opposite the support element 30. The spherical segment-shaped ring 38 almost completely surrounds the ball head 12 on this side, except for the free space or swiveling space required to allow the piston rod 8 to swivel. The spherical segment-shaped ring 38 is designed as the terminal part of a second support element 40 which is shaped in the form of a support sleeve. The second support element 40 extends approximately from the middle of the ball-shaped head 12 to the terminal axial area 42 of the piston shaft sleeve 36, where it is supported by a positive connection 44 so that the second support element cannot move axially inside the piston shaft sleeve 36. For this purpose, a ring-shaped collar 48 is formed on the second support element 40, the collar being held permanently by a rolled-over end of the piston shaft sleeve 36. The positive connection 44 is thus located outside the area in which the ball joint 10 operates. As a result, even extreme shock-like loads on the ball joint 10 are kept away from the positive connection 44, which has the effect of reliably preventing the positive connection 44 from working loose. The piston rod 8 passes through a central opening 50 in the spherical segment-shaped ring 38, i.e., through the second support element 40. A ring-shaped contact surface 52, on which the piston rod 8 can rest, forms the boundary of the range within which the piston rod 8 is able to swivel. The contact surface 52 is on the inside diameter of the second support element 40 immediately adjacent to the spherical segment-shaped ring 38. From the perspective of the ball-shaped head 12, the second support element 40 also has an expanding, funnel-shaped section 54. A cylindrical section 56 continues from the funnel shaped section 54, takes up about 80% of the total length of the element and rests against the piston shaft sleeve 36.

If the piston rod 8 to be mounted has a ball-shaped head 12 or some other fastening element at both ends with a diameter which is larger than the inside diameter of the spherical segment-shaped ring 38, one or more axial slots 68 are provided in the second support element 40, which extend back from the spherical segment-shaped ring 38, as shown in FIG. 2b. The axial slots 68 allow the second support element 40 to elastically expand, so that the ball-shaped head 12 or other section with a diameter larger than the spherical-shaped ring may be easily installed by briefly expanding the sleeve and by pushing the ball-shaped head 12 or other section past the narrow point of the ring 38. In the area of the ball-shaped head 12 where sections of the first and second support elements 30, 40 confrontingly oppose each other, the first support element 30 has a section of reduced diameter with an outer lateral surface 58 and an axial contact surface 60. A take-up ring 62 of plastic or metal is pushed against the outer lateral surface 58 and the axial contact surface 60. The take-up ring 62 simultaneously also surrounds an outer lateral surface 64 of the spherical segment-shaped ring 38, which has here the same diameter as that of the reduced-diameter section of the first support element 30. An axial gap 66 may be provided between the first support element 30 and the second support element 40 to compensate for manufacturing tolerances. As a result of this design, it is possible in particular for the forces which occur when tensile load is exerted on the ball joint 10, i.e., forces which can have the effect of expanding the spherical segment-shaped ring 38, are taken up and thus are prevented from being transmitted onward to the relatively thin-walled piston shaft sleeve 36, which is thus safe from deformation. Of course, the take-up ring 62 may be installed only on the outer lateral surface 64 of the spherical segment-shaped ring 38, because there is no danger that the first support element 30 could undergo radial expansion. If the free end of the piston rod 8 has a diameter smaller than the inside diameter of the spherical segment-shaped ring 38, the axial slots 68 may be eliminated from the spherical segment-shaped ring 38 and the outer diameter of the ring 38 may be expanded all the way to the piston shaft sleeve 36. In this situation, the take-up ring 62 can thus be completely eliminated.

To assemble the piston unit 26, the first support element 30 is inserted into the piston shaft sleeve 36 and pushed all the way to the bottom 32. The end of the piston rod 8 facing away from the ball-shaped head 12 is then passed through the central opening 50 in the spherical segment-shaped ring 38 or in the second support element 40. The take-up ring 62, if present, is then pushed onto the spherical segment-shaped ring 38. The structural unit thus produced is also inserted into the piston shaft sleeve 36. Finally, the terminal area 42 of the piston shaft sleeve 36 is then rolled over the ring-shaped collar 48 of the second support element 40, and the piston unit 26 is thus prevented from falling apart unintentionally.

As shown by way of example in FIG. 2c, latching connections 63a, 63b may also be provided between the take-up ring 62 and the support element 30 and/or between the take-up ring 62 and the support sleeve 40. In this design, all of the parts to be installed in the piston shaft sleeve 36 can be preassembled and then inserted into the piston shaft sleeve 36 as a single structural unit.

Alternatively, a self-locking connection may also be established directly between the first support element 30 and the second support element 40, in which case a take-up ring 62 is not needed. To illustrate this, another piston unit 26a is shown in FIG. 3, which differs from the previous example in that the support element 30a has a ring-shaped web 70 on a radially outer side thereof, which holds the second support element 40a in the area of the spherical segment-shaped ring 38a. The second support element 40a may include axial slots 68 if necessary to allow the piston rod 8 to be installed. The web 70 also secures the second support element 40a against radial expansion. Adjacent to the ring-shaped web 70 is a further ring-shaped extension 72 with an expanded inside diameter, which carries a circumferential, radially inward-oriented latching projection 74. This projection 74 cooperates with a recess formed by a corresponding ring-shaped latching projection 76 formed on a radially outer side of the second support element 40a. An additional take-up ring 62 is not required in this embodiment. As a modification of FIG. 3, the first and second support elements 30, 40 in the piston 6 according to FIG. 1 are designed without latching means.

As described above, the piston shaft sleeve 36 may be designed as a thin-walled, deep-drawn part of a metallic material with a wall thickness of one millimeter or less, such as in the range of 0.5–0.7 millimeter. This is possible because the design of the first and second support elements 30, 40 and/or of the take-up ring 62 considerably increases the strength of the piston 6, and these elements thus form a support frame for the piston shaft sleeve 36.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A cylinder for a hydraulically actuated clutch or brake system in a motor vehicle, comprising:
    a housing;
    a piston axially moveably arranged in said housing; and
    a piston rod having a ball-shaped bead and connected to said piston,
    wherein said piston comprises a piston shaft sleeve and first and second support elements forming a spherical socket supporting said ball-shaped head so that the spherical socket and said ball-shaped head form a ball joint, said first and second support elements being supported by said piston shaft sleeve against forces introduced by said piston rod such that said piston and said piston rod are connected to each other essentially without play and arc swivelable relative to each other at the ball joint, said first support element comprising a hemispherical shell enclosing one half of said ball-shaped head which faces away from said piston rod, said second support element comprising a spherical-segment-shaped ring defining an opening through which said piston rod passes, and supporting the other half of said ball-shaped head, wherein said second support element includes a support sleeve and said spherical-segment-shaped ring is formed on said support sleeve.

2. The cylinder of claim 1, wherein the piston shaft sleeve comprises a closed bottom, said first support element being supported axially against said closed bottom of said piston shaft sleeve.

3. The cylinder of claim 1, wherein said second support element is secured axially at one end of the piston shaft sleeve by a latching connection.

4. The cylinder of claim 1, wherein one end of said piston shaft sleeve includes a collar and said second support element is secured axially at the one end of the piston shaft sleeve by said collar on said piston shaft sleeve.

5. The cylinder of claim 1, wherein said second support element has a contact surface contactable by said piston rod for limiting the swiveling movement of said piston rod at said ball joint.

6. The cylinder of claim 1, wherein said first and second support elements form a support frame for said piston shaft sleeve.

7. The cylinder of claim 6, wherein said piston shaft sleeve is a thin-walled part that is deep-drawn from a metal material.

8. The cylinder of claim 1, wherein said piston shaft sleeve is a thin-walled part that is deep-drawn from a metal material.

9. A cylinder for a hydraulically actuated clutch or brake system in a motor vehicle, comprising:
a housing;
a piston axially moveably arranged in said housing; and
a piston rod having a ball-shaped head and connected to said piston,
wherein said piston comprises a piston shaft sleeve and first and second support elements forming a spherical socket supporting said ball-shaped head so that the spherical socket and said ball-shaped head form a ball joint said first and second support elements being supported by said piston shaft sleeve against forces introduced by said piston rod such that said piston and said piston rod are connected to each other essentially without play and are swivelable relative to each other at the ball joint, said first support element comprising a hemispherical shell enclosing one half of said ball-shaped head which faces away from said piston rod, said second support element comprising a spherical-segment-shaped ring defining an opening through which said piston rod passes, and supporting the other half of said ball-shaped head, wherein said second support element has at least one axial slot proximate said spherical-segment-shaped ring, said cylinder further comprising a take-up ring at least partially surrounding said spherical-segment-shaped ring and preventing radial expansion of said spherical-segment-shaped ring.

10. The cylinder of claim 9, wherein said first and second support elements comprise confrontingly opposed ends, wherein said take-up ring is a common take-up ring surrounding both of said confrontingly opposed ends.

11. The cylinder of claim 10, further comprising a latching connection between said take-up ring and each of said first and second support elements for retaining said first and second support element and said piston rod as a structural unit.

12. The cylinder of claim 9, further comprising a latching connection between said take-up ring and said second support element.

13. The cylinder of claim 9, wherein said first and second support elements form a support frame for said piston shaft sleeve.

14. The cylinder of claim 9, wherein said piston shaft sleeve is a thin-walled part that is deep-drawn from a metal material.

15. A cylinder for a hydraulically actuated clutch or brake system in a motor vehicle, comprising:
a housing;
a piston axially moveably arranged in said housing; and
a piston rod having a bail-shaped head and connected to said piston,
wherein said piston comprises a piston shaft sleeve and first and second support elements forming a spherical socket supporting said ball-shaped head so that the spherical socket and said ball-shaved head form a ball joint, said first and second support elements being supported by said piston shaft sleeve against forces introduced by said piston rod such that said piston and said piston rod are connected to each other essentially without play and are swivelable relative to each other at the ball joint, said first support element comprising a hemispherical shell enclosing one half of said ball-shaped head which faces away from said piston rod, said second support element comprising a spherical-segment-shaped ring defining an opening through which said piston rod passes, and supporting the other half of said ball-shaped head, wherein said first support element includes a ring-shaped web proximate said hemispherical shell which receives an area of said second support element proximate the spherical-segment-shaped ring, said ring-shaped web preventing radial expansion of said area of said second support element.

16. The cylinder of claim 15, wherein said ring shaped web holds the area of said second support element by a latching connection.

17. The cylinder of claim 15, wherein said first and second support elements form a support frame for said piston shaft sleeve.

18. The cylinder of claim 15, wherein said piston shaft sleeve is a thin-walled part that is deep-drawn from a metal material.

* * * * *